United States Patent [19]

Todd

[11] Patent Number: 5,367,415
[45] Date of Patent: Nov. 22, 1994

[54] AUTOMATIC MAGNETIC TAPE CARTRIDGE SEPARATOR FOR TAPE DRIVE SYSTEMS

[75] Inventor: Christian A. Todd, Thornton, Colo.
[73] Assignee: Storage Technology Corporation, Louisville, Colo.
[21] Appl. No.: 15,754
[22] Filed: Feb. 10, 1993
[51] Int. Cl.$^5$ .............................................. G11B 15/68
[52] U.S. Cl. ..................................... 360/92; 369/204; 414/797.7
[58] Field of Search .................. 360/92, 98.06, 98.04; 369/204–205; 414/797.7, 792.2–792.3, 793.9

[56] References Cited

U.S. PATENT DOCUMENTS 5,144,506  9/1992  Sahota .................................. 360/92

FOREIGN PATENT DOCUMENTS 1618710  1/1991  U.S.S.R. ............................. 414/797.7

Primary Examiner—A. J. Heinz
Attorney, Agent, or Firm—Pennie & Edmonds

[57] ABSTRACT

The automatic magnetic tape cartridge separator includes a means of receiving a plurality of magnetic tape cartridges in a stack. The stack is biased against a separator apparatus having two rotatable bodies of two or more separating rollers mounted to rotate along an axis perpendicular to the stack. The simultaneous rotation of the bodies in opposite directions causes each succeeding roller on the first body and the corresponding roller on the second body, first, to engage the interface between the succeeding magnetic tape cartridge and preceding magnetic tape cartridge in the stack, and second, to support entire stack less the bottom most magnetic tape cartridge, which is separated and supported by the preceding set of rollers for removal to a tape drive. Adding a second stack of magnetic tape cartridges biased against the separator apparatus from the other direction and reversing the direction of the rotation of the bodies enables the separator to randomly separate, and thereby access, any object in the two stacks on demand.

19 Claims, 9 Drawing Sheets

AUTOMATIC MAGNETIC TAPE CARTRIDGE SEPARATOR FOR TAPE DRIVE SYSTEMS

BACKGROUND

This invention relates generally to accessing objects in a stack of objects for removal and, more particularly, to an apparatus for randomly accessing a magnetic tape cartridge from a stack of magnetic tape cartridges to efficiently load and unload magnetic tape cartridges on a tape drive.

In the past, an operator manually loaded and unloaded magnetic tape cartridges of the IBM 3480 type into a tape drive one magnetic tape cartridge at a time. The tape drive ejected the magnetic tape cartridge once the associated data processing system read/wrote data on the magnetic tape. The tape drive remained in an idle state until an operator retrieved the magnetic tape cartridge ejected by the tape drive and replaced it with a new magnetic tape cartridge. Such a manual operation was time consuming, inefficient and prone to error.

An improvement over this manual magnetic tape cartridge loading arrangement was the use of an automatic loader mechanism which typically consisted of a plurality of individual tape cartridges storage slots, each of which held a single 3480 type magnetic tape cartridge. An operator manually loaded each magnetic tape cartridge, one at a time, into a corresponding individual magnetic tape cartridge storage slot of this automatic loader mechanism.

The automatic loader mechanism sequentially and automatically loaded each of the magnetic tape cartridges into the tape drive associated with the automatic loader mechanism. This was accomplished by sequentially translating the magnetic tape cartridge "rack", one individual magnetic tape cartridge storage slot at a time, into position in front of the tape drive. The magnetic tape cartridge stored in the corresponding individual magnetic tape cartridge storage slot was then loaded into the tape drive. Once the loaded magnetic tape cartridge was read or written by the tape drive, the tape drive ejected the magnetic tape cartridge. The automatic loader mechanism retrieved the ejected magnetic tape cartridge, placed it into an ejected magnetic tape cartridge stack and automatically advanced the individual magnetic rack to the next individual magnetic tape cartridge storage slot that contained an unused magnetic tape cartridge.

There were a number of disadvantages with the automatic loader described above. First, it was time consuming for the operator to load the magnetic tape cartridges one at a time into corresponding individual magnetic tape cartridge storage slots in the automatic loader mechanism. Second, the use of individual magnetic tape cartridge storage slots consumed space in the loader mechanism and required additional mechanisms to operate. Finally, the automatic loader was a unidirectional mechanism, in that it could only load magnetic tape cartridges into the tape drive mechanism and eject spent magnetic tape cartridges into the spent magnetic tape cartridge stack. Any magnetic tape cartridge that was placed in the spent magnetic tape cartridge stack could not be reinserted into the tape drive by the automatic loader mechanism.

U.S. Pat. No. 4,835,634 to Ostwald, and assigned to Storage Technology Corporation, herein incorporated by reference, discloses a prior art automatic magnetic tape cartridge stack loader apparatus, shown in FIG. 1 hereof, which addressed these problems. The loader is mounted in front of an associated tape drive for loading and unloading magnetic tape cartridges in the associated tape drive. The automatic magnetic tape cartridge loader apparatus comprises a stack loader slot 100 that enables an operator to load an entire stack of magnetic tape cartridges into the apparatus rather than having to load individual magnetic tape cartridges into individual magnetic tape cartridge slots.

The stack loader slot 100 is supported on the bottom by a drop mechanism 103 that translates the stack of magnetic tape cartridges in a downward direction so that the bottom most magnetic tape cartridge in the stack is in position in front of the access port of the associated tape drive, and supported by a load mechanism 104 for insertion into the associated tape drive.

The stack loader slot 100 is bounded on two sides by stack grab plates 101, 102. These plates 101, 102 are movable in the horizontal direction (illustrated by arrow C) to come into contact with the stack of magnetic tape cartridges loaded in stack loader slot 100 and to securely hold the stack of magnetic tape cartridges in a clamping operation. The stack grab plates 101, 102 operate to clamp the stack of magnetic tape cartridges, less the bottom most one, as the stack is translating downward. Once the bottom most magnetic tape cartridge is positioned on the load mechanism 104, the drop mechanism 103 is operated to be repositioned under the remaining stack of magnetic tape cartridges held by the stack grab plates.

A tractor mechanism 126 is then activated to load the magnetic tape cartridge from the load mechanism 104 into the associated tape drive. When the magnetic tape cartridge is ejected from the associated tape drive, the tractor mechanism 126 loads the ejected magnetic tape cartridge onto the load mechanism 104 where it is placed on to an elevator mechanism 112 that supports a stack of ejected magnetic tape cartridges.

There are a number of disadvantages to the automatic magnetic tape cartridge stack loader apparatus. The pressure placed upon the magnetic tape cartridges in the stack during clamping operation by the stack grab plates 101, 102 may deform or distort the magnetic tape cartridge, thereby running the risk of rendering it unreadable/unwritable by a tape drive. In addition, the stack loader apparatus does not provide the functionality to randomly access for subsequent reloading onto a tape drive for reading/writing any magnetic tape cartridge at any time. Finally, gravity is essential to the proper operation of the drop mechanism in stack loader apparatus. Therefore, the stack of magnetic tape cartridges must be aligned along a vertical axis for the stack loader apparatus to operate properly.

For the foregoing reasons, there is a need for an apparatus that (1) individually removes magnetic tape cartridges from a stack of magnetic tape cartridges without causing the deformation or distortion thereof, (2) can randomly access any object in the stack, and (3) can operate upon a stack of magnetic tape cartridges aligned along any axis.

SUMMARY OF THE INVENTION

The present invention is directed to an apparatus that individually separates magnetic tape cartridges from a stack of magnetic tape cartridges for removal without the use of any gripping or clamping device on the stack.

An apparatus for separating magnetic tape cartridges embodying the present invention includes two bodies of two or more rods or rollers and a means for rotating the bodies. Each of the bodies is mounted to rotate along an axis perpendicular to the stack. The rollers of each of the bodies are evenly spaced with respect to each other and are axially projecting along the axis of rotation. The simultaneous rotation of the bodies of rollers in opposite directions causes each succeeding roller on the first body of rollers and the corresponding roller on the second body of rollers to engage the space between the succeeding magnetic tape cartridge and preceding magnetic tape cartridge in the stack. Further rotation causes this set of rollers to support the stack of magnetic tape cartridges, less the bottom most magnetic tape cartridge, while the previous set of rollers support only the bottom most one from the stack. Still further rotation causes the bottom most magnetic tape cartridge to be deposited and the next set of rollers to engage the next magnetic tape cartridge.

Another advantage made possible by the present invention is the ability to randomly access any magnetic tape cartridge in a stack of magnetic tape cartridges at any time.

That advantage may be achieved with an embodiment including a first and second stack of magnetic tape cartridges. The first stack of magnetic tape cartridges is similar in structure and function to the stack described above. The second stack of magnetic tape cartridges is situated beneath the two bodies of rollers and is biased against the bodies by means of a spring loaded device. The rotation of the bodies in the direction opposite from that described above causes the apparatus to individually separate each of the magnetic tape cartridges in the second stack of objects in the same way as described above with respect to the first stack. Accordingly, reversing the direction of the rotation of the bodies enables one to randomly separate, and thereby access, any object in the two stacks of magnetic tape cartridges on demand.

Yet another advantage offered by the present invention is separating apparatus which is not dependent upon gravity.

In one embodiment, one or more stacks of magnetic tape cartridges are biased against a separator apparatus as described above by means of spring loaded devices rather than by the force of gravity.

These and other features, aspects and advantages of the present invention will become better understood with reference to the following description and appended claims.

DETAILED DESCRIPTION OF THE INVENTION

Figure 1:
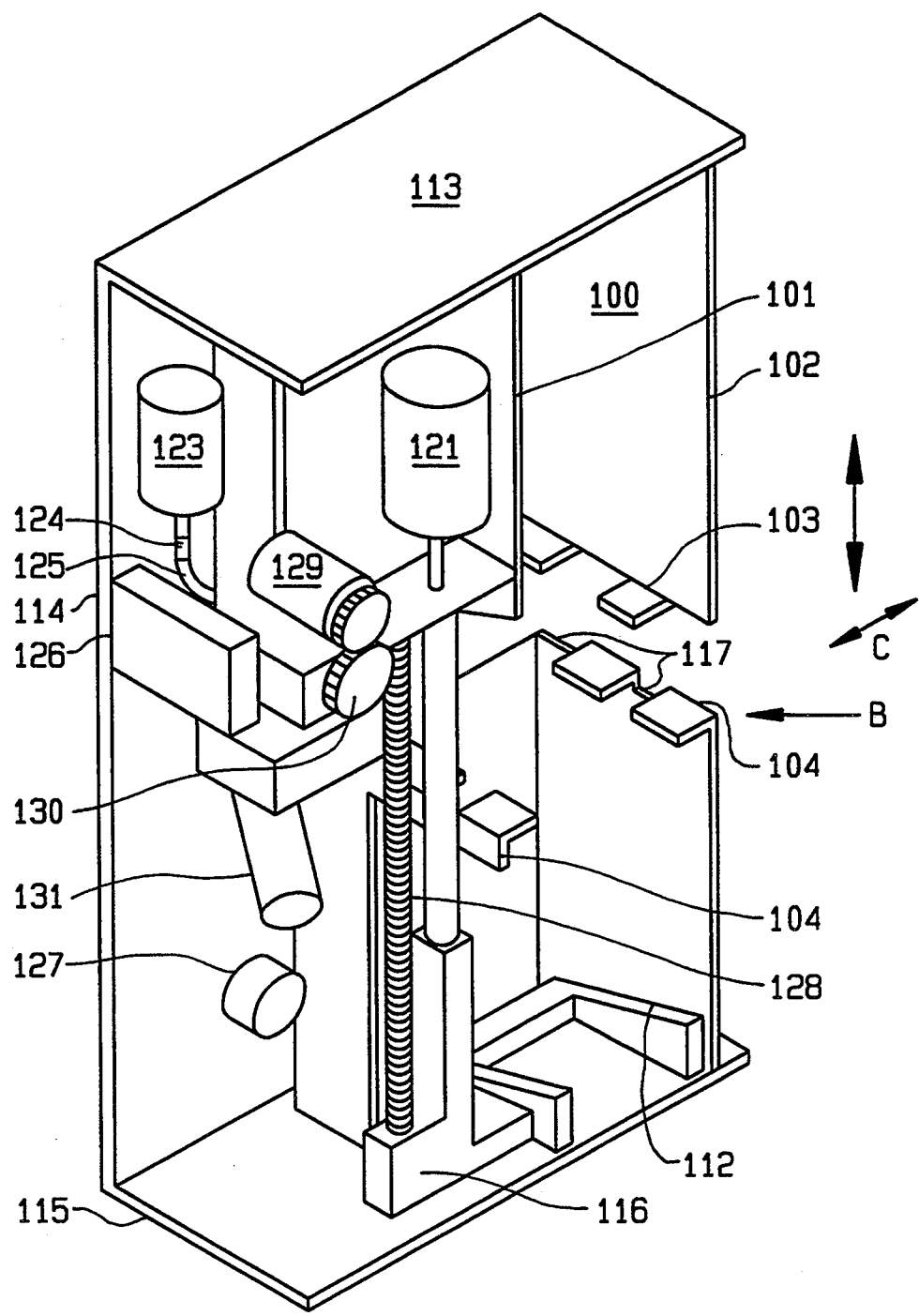
FIG. 1 illustrates the automatic magnetic tape cartridge stack loader for tape drive systems in cut away perspective view.
Figure 2A:
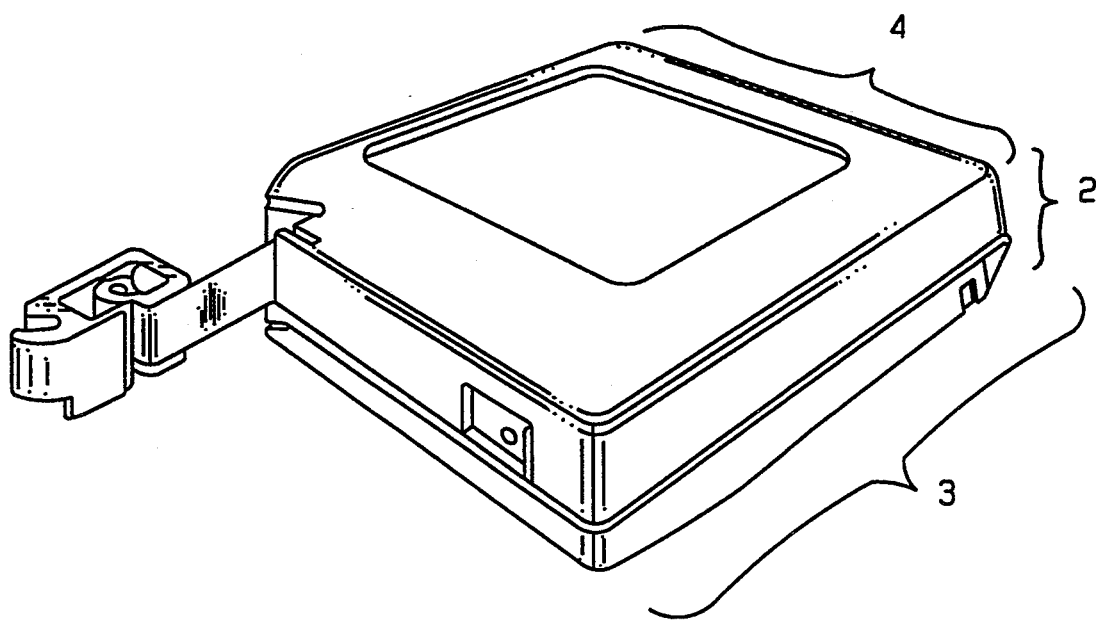
FIG. 2a illustrates a magnetic tape cartridge in perspective view.

To assist in the description of an automatic magnetic tape cartridge separator apparatus, a perspective view of an IBM 3480 magnetic tape cartridge is provided in FIG. 2a. Dimensions 2, 3 and 4 will hereinafter be referred to as, respectively, the "height", "width" and "length" of a magnetic tape cartridge.

Figure 3:
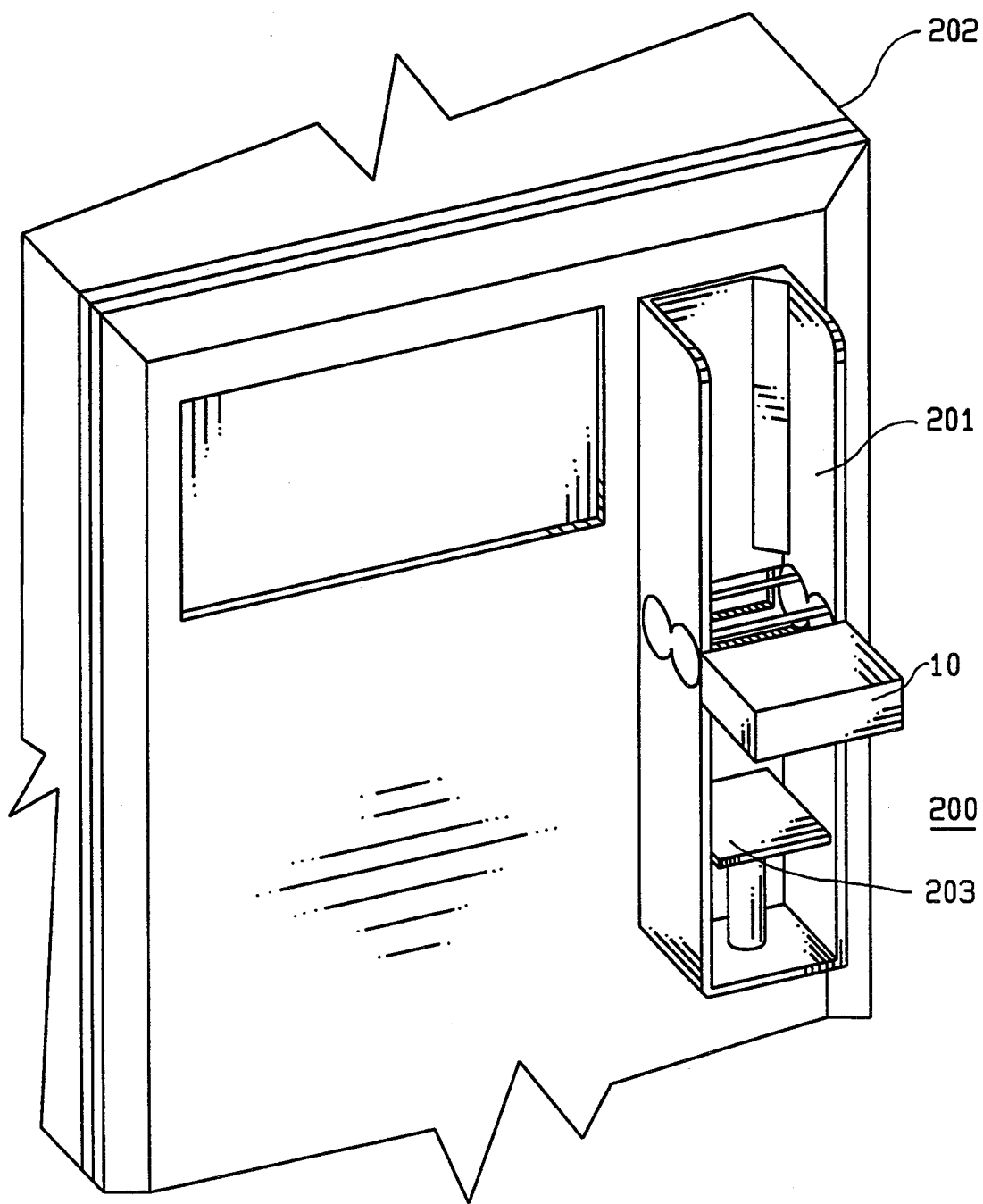
FIG. 3 illustrates the automatic magnetic tape cartridge separator apparatus for tape drive systems in a perspective view.

An automatic magnetic tape cartridge separator apparatus is illustrated in FIG. 3. The apparatus includes a stack load slot 200 into which a plurality of magnetic tape cartridges can be inserted in a single operation. The stack load slot 200 is bounded by tape guide 201. An operator loads a plurality of magnetic tape cartridges into the stack load slot 200. The stack of magnetic tape cartridges, guided by tape guide 201, drops onto a separator apparatus shown in FIG. 4.

Figure 4:
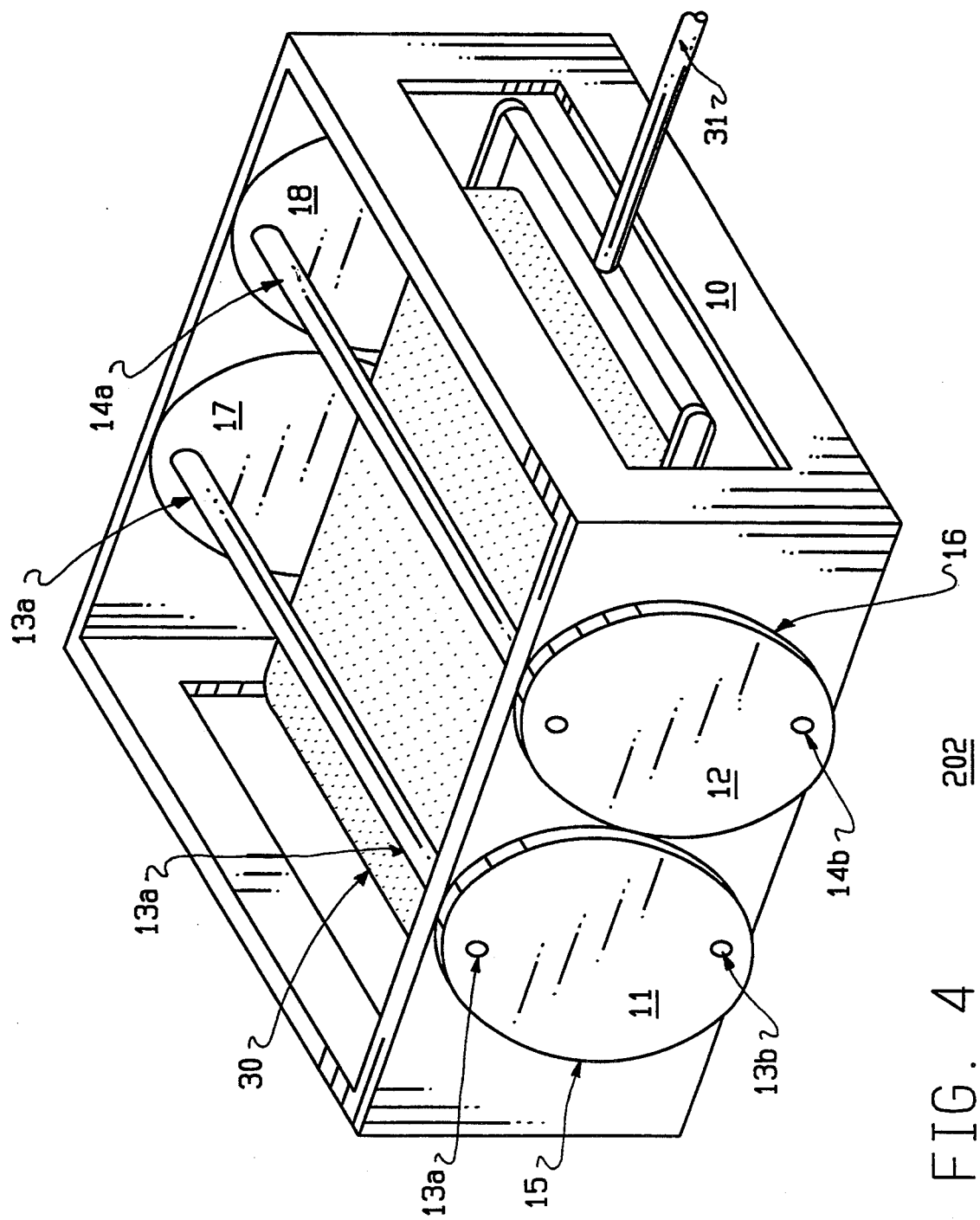
FIG. 4 illustrates the separator apparatus with rotatable bodies having two evenly dispersed rollers in perspective view.

The separator apparatus according to the preferred embodiment shown in FIG. 4 includes a housing 10 and two rotatable bodies 11 and 12. The housing 10 and its included apparatus is situated in front of a tape drive 202. The tape drive has an access port into which a magnetic tape cartridge can be placed by an operator or by the automatic magnetic tape cartridge separator apparatus. The housing 10 has an opening 30 therein that matches the size, shape and position of the access port of the associated tape drive 202. Opening 30 is placed in juxtaposed position with the front of the tape drive such that the automatic magnetic tape cartridge separator apparatus can load a magnetic tape cartridge through the opening 30 into the access port of the tape drive 202 as is discussed below.

Each of the rotatable bodies 11, 12 illustrated in FIG. 4 is constructed from a first wheel 15, 16 and a second wheel 17, 18 coaxially placed at opposite ends of the bodies. The first and second wheels are adapted to rotate about an axis perpendicular to the stack of magnetic tape cartridges. The distance between the first and second wheel of each body must be greater than the width of the magnetic tape cartridges in the stack to allow the cartridges to pass between the wheels.

Figure 5A:
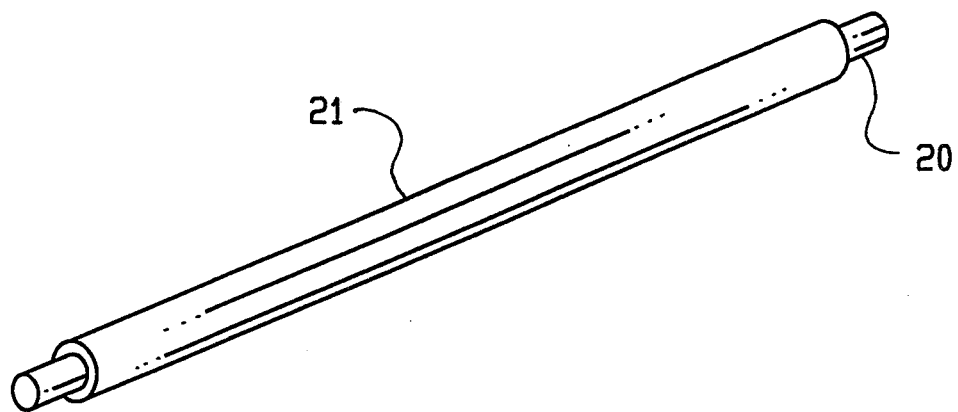
FIG. 5a illustrates a roller in perspective view.

In FIG. 4, two rollers 13a, 13b and 14a, 14b are axially projecting along the axis of rotation between the first and second wheels of each of the bodies. As shown in FIG. 5, rollers comprising a shaft 20 and a freely rotatable annular sleeve 21 circumjacent to the shaft 20 are preferably used. The annular sleeve 21 is free to rotate about the shaft 20. In the operation of the separator apparatus, rollers reduce friction between the surface of the magnetic tape cartridge and the separating means. The shafts of each of the rollers are circumferentially attached at or near the perimeters of the wheels 180 degrees apart from each other. In an alternative embodiment, rods are used in place of the rollers.

Figure 5B:
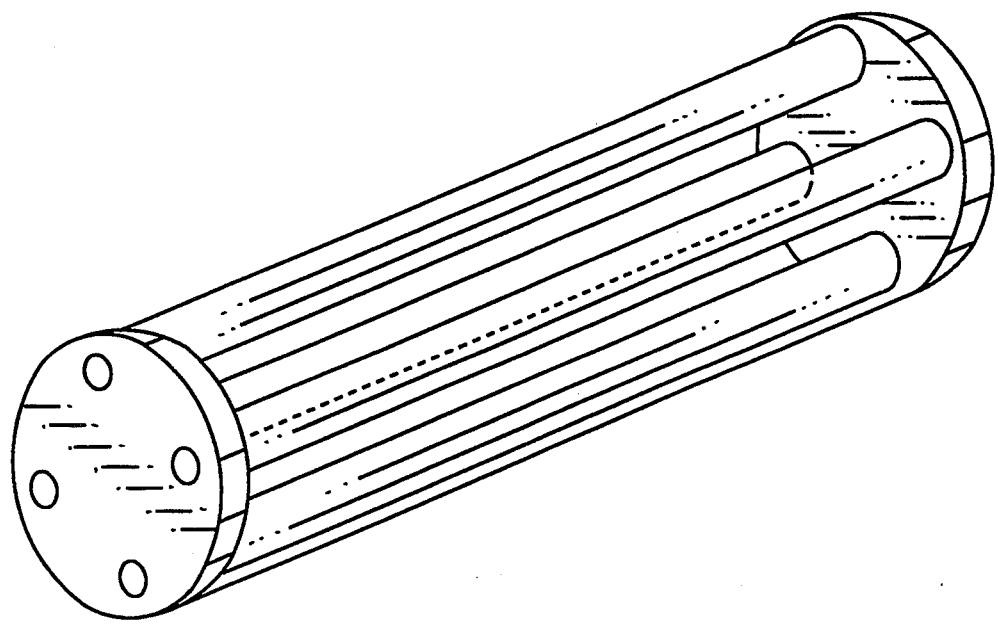
FIG. 5b illustrates a rotatable body with four rollers in perspective view.

In an alternative embodiment shown in FIG. 5b, more than two rollers may be axially projecting about the axis of rotation between the first and second wheels of each of the bodies. In such an embodiment, the rollers are circumferentially and evenly dispersed along the perimeter of the wheels.

Figure 6A:
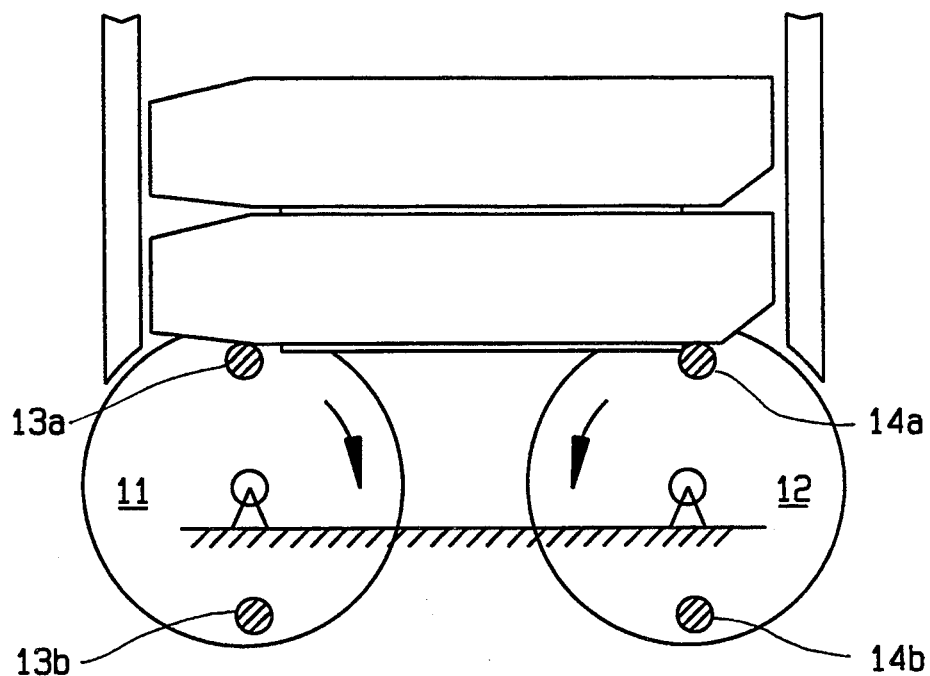
FIG. 6a–e is a diagram of the operation of the separator apparatus with a first stack.
Figure 6B:
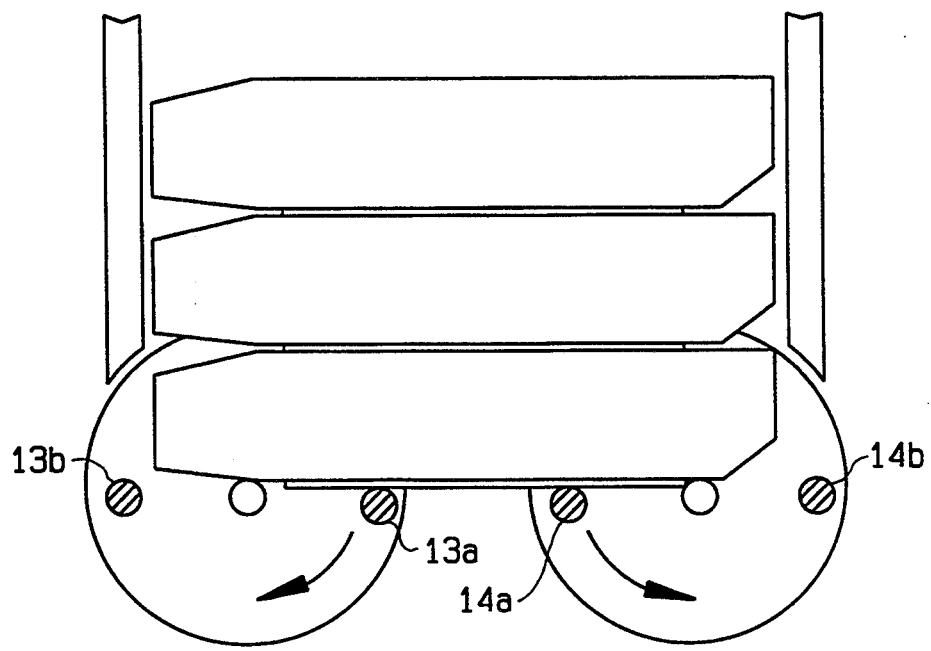

In FIG. 6a, a stack of magnetic tape cartridges is shown situated above the separator apparatus in its initial configuration. The bodies 11 and 12 are positioned so that rollers 13a and 14a are at the apex of their respective circular paths. The entire stack of magnetic tape cartridges rests upon the rollers 13a and 14a. Simultaneously and at the same angular velocity, body 11 is rotated clockwise and body 12 is rotated counterclockwise. As illustrated in FIG. 6b, rotation of the bodies causes rollers 13a and 14a to descend, and rollers 13b and 14b ascend, along their respective circular paths. As rollers 13a and 14a descend, the stack of magnetic tape cartridges, being supported by the rollers 13a and 14a, translates in a downward direction.

Further rotation causes rollers 13b and 14b to ascend along their circular paths towards the next magnetic tape cartridge in the stack of magnetic tape cartridges. The stack, still being supported by descending rollers 13a and 14a, translates in a downward direction further.

Figure 6C:
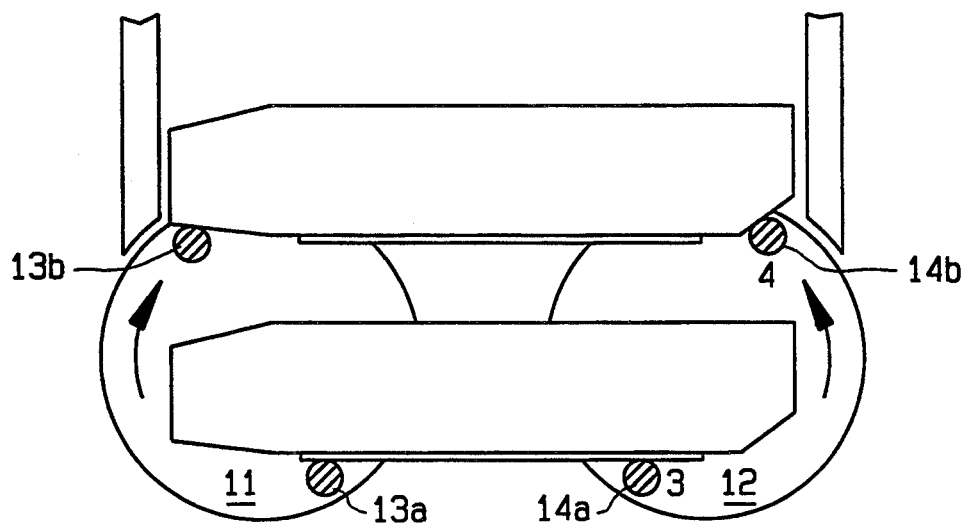

Rotation proceeds while, as illustrated in FIG. 6c, rollers 13b and 14b engage the next magnetic tape cartridge in the stack. The distance from the axis of rotation of the first body 11 to the axis of rotation of the second body 12 and the radial distance between the axis of rotation of each of the bodies and their rollers is chosen to cause each succeeding set of rollers, in this case rollers 13b and 14b, to make contact with the magnetic tape cartridge in the stack that rest above the magnetic tape cartridge being supported by the preceding set of rollers at the point where the top of the preceding magnetic tape cartridge and the bottom of the next magnetic tape cartridge meet.

Figure 2B:
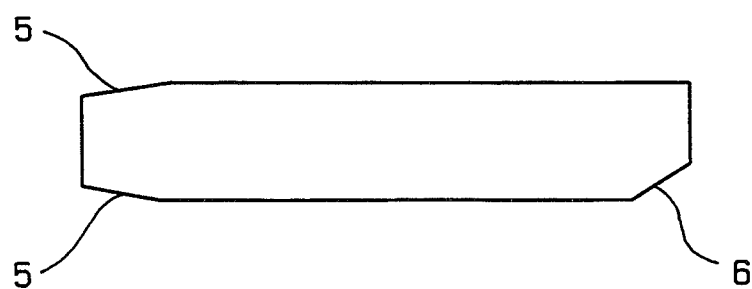
FIG. 2b illustrates the profile of a magnetic tape cartridge.

Referring to FIG. 2b, the profile of an IBM 3480 magnetic tape cartridge is shown. ANSI specification X3B5/88-044 controls the profile. The operation of the separator apparatus takes advantage of the leading decline 5 and trailing incline 6 of the magnetic tape cartridge. Each succeeding pair of rollers engage the stack of magnetic tape cartridge at the decline 5 and incline 6 of the next magnetic tape cartridge. This feature of the shape of magnetic tape cartridges greatly facilitates the separation process.

Returning to description of the operation of the separator apparatus, FIG. 6c illustrates further rotation of bodies 11 and 12 causing rollers 13b and 14b to roll under the next magnetic tape cartridge in the stack. Rollers 13b and 14b lift and support all of the stack except the preceding magnetic tape cartridge, which continues to be supported by rollers 13a and 14a.

Figure 6D:
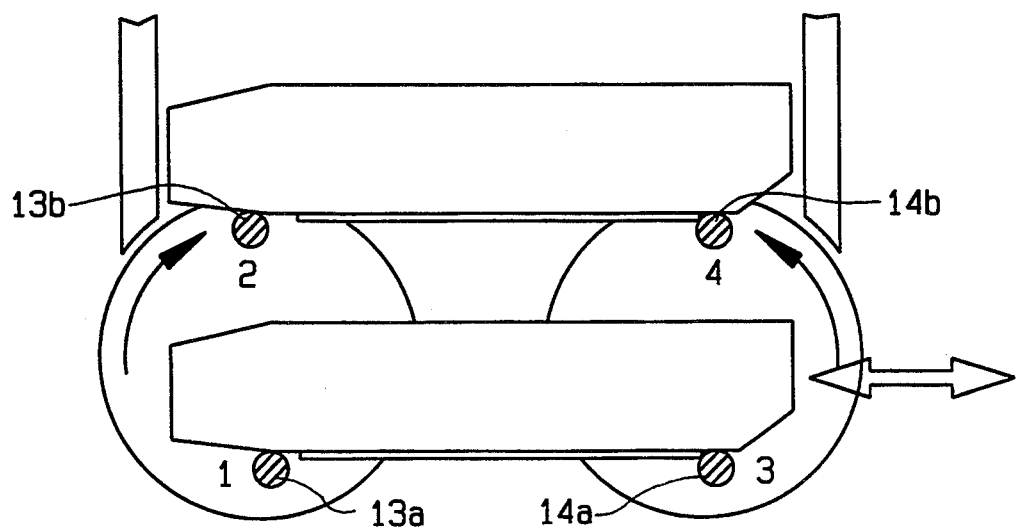

As illustrated in FIG. 6d, when rollers 13b and 14b are at or near the apex of their respective circular paths, all of the stack except for the last magnetic tape cartridge is supported by rollers 13b and 14b. The last magnetic tape cartridge is separated and supported by rollers 13a and 14a.

As illustrated in FIG. 4, the tape drive has an access port into which a magnetic tape cartridge can be placed by the automatic magnetic tape cartridge separator apparatus. The housing 10 of the separator apparatus has an opening 30 therein that matches the size, shape and position of the access port of the associated tape drive. Opening 30 is placed in juxtaposed position with the front of the tape drive such that the automatic magnetic tape cartridge separator apparatus can load a magnetic tape cartridge through the opening 30 into the access port of the associated tape drive. When a magnetic tape cartridge is separated and supported by the rollers 13a and 14a, as is illustrated in FIG. 3, the rollers are aligned parallel to opening 30 and the magnetic tape cartridge has an unobstructed path through opening 30. The magnetic tape cartridge is placed into the access port of the associated tape drive by the operation of a loading mechanism that is part of the automatic magnetic tape cartridge separator apparatus. The reverse operation of the loading mechanism unloads or dismounts the magnetic tape cartridge from the tape drive.

In the preferred embodiment of the present invention, the loading mechanism consists of a two-finger gripping mechanism 31. During the loading operation, the gripping mechanism, driven by electromagnetic means, engages the separated magnetic tape cartridges and pushes it through the opening 30 into the access port of the associated tape drive.

When a magnetic tape cartridge is dismounted from a tape drive into the automatic magnetic tape cartridge separator apparatus, the rollers must again be aligned parallel to opening 10 and no magnetic tape cartridge may be between the rollers of the separator apparatus. There are three alternative states in which this is the case. First, instances where the automatic magnetic tape cartridge separator apparatus has loaded a magnetic tape cartridge onto the tape drive and the apparatus has since remained idle. The second and third alternatives are instances where the separator apparatus is either at the top or the bottom of the stack of magnetic tape cartridges. Whichever the case, a magnetic tape cartridge is dismounted from the associated tape drive by reversing the operation of the loading operation. Electromagnetic means drives the gripping means through the separator apparatus between the empty rollers and engages the magnetic tape cartridge in the associated tape drive. Reversing the direction of the gripping means pulls the magnetic tape cartridge out of the associated tape drive and into the stack of magnetic tape cartridges.

In an alternative embodiment of the present invention, a tractor mechanism similar to the mechanism disclosed in U.S. Pat. No. 4,835,634 is employed as the loading mechanism.

Figure 6E:
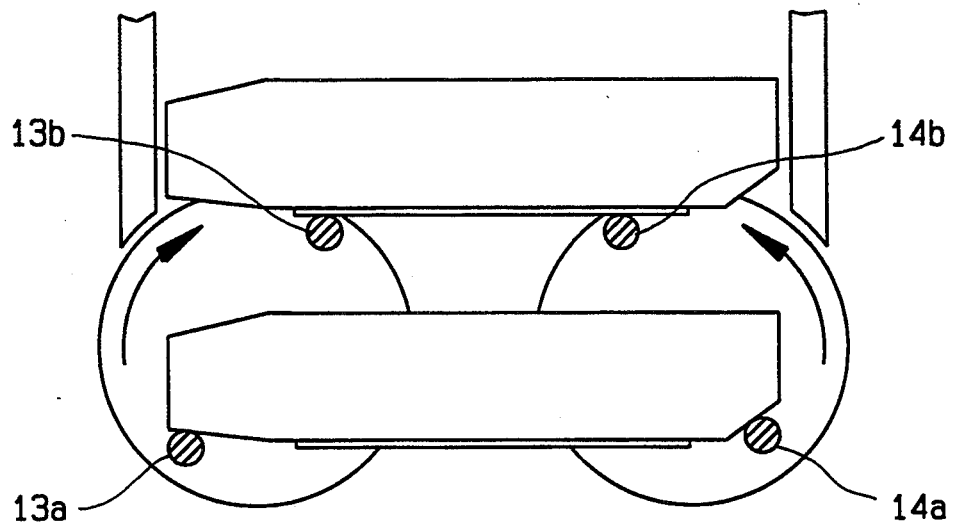

Returning to the description of the operation of the separator apparatus, further rotation illustrated in FIG. 6e causes rollers 13a and 14a to roll away from one another along the bottom of the separated magnetic tape cartridge until, as in FIG. 6f, they no longer support the cartridge. The separated magnetic tape cartridge is deposited beneath the separator.

Figure 7:
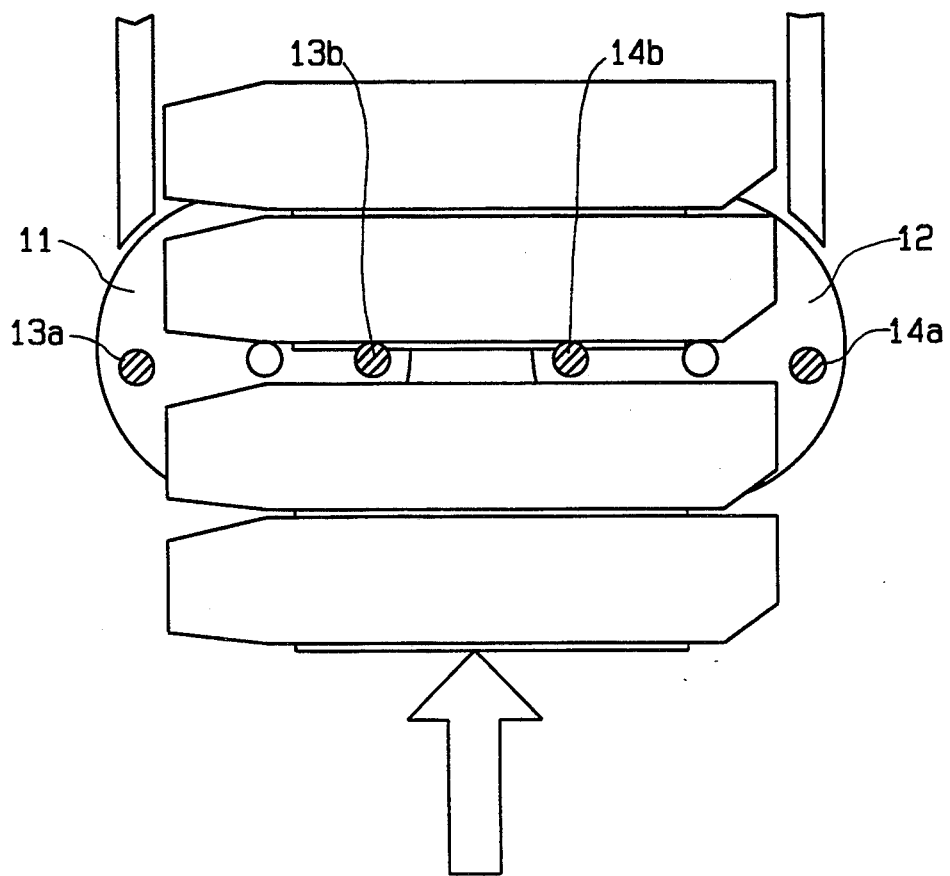
FIG. 7 is a diagram of the operation of the separator apparatus with a first and second stack.

In an alternative embodiment of the invention shown in FIG. 7, a second stack of magnetic tape cartridges is situated beneath the separator apparatus. The second stack of magnetic tape cartridges is biased against the separator apparatus by means of a spring loaded tray or similar device 203 (see also FIG. 3). The top magnetic tape cartridge of the second stack is biased against rollers 13b and 14b. Reversing the direction of rotation of bodies 11 and 12 will cause the separator to separate magnetic tape cartridges for removal from the second stack in the same way the separator described above separates magnetic tape cartridges from the first stack.

In the initial configuration of this alternative embodiment of the separator apparatus, the second of stack of magnetic tape cartridges is biased against the separator apparatus by means of a spring loaded tray or similar device. Body 11 is rotated counterclockwise and body 12 is rotated clockwise simultaneously at the same angular velocity. The rotation of the bodies causes rollers 13a and 14a to engage the next magnetic tape cartridge in the second stack. As the bodies are rotated, rollers 13b and 14b ascend along their respective circular paths while supporting and causing the first stack to translate in a upward direction. Further rotation separates the next magnetic tape cartridge from the remainder of the second stack, the separated magnetic tape cartridge being supported by rollers 13a and 14a.

As described above, when a magnetic tape cartridge is separated and supported by the rollers 13a and 14a, the rollers are aligned parallel to opening 30 and the magnetic tape cartridge has an unobstructed path through opening 30. The magnetic tape cartridge is placed into the access port of the associated tape drive by the operation of a loading mechanism. The reverse operation of the loading mechanism unloads or dismounts the magnetic tape cartridge from the tape drive.

Further rotation causes rollers 13b and 14b to spread apart from each other along their respective circular paths. When rollers 13b and 14b are greater than the length of the magnetic tape cartridge apart from each other, the first stack of magnetic tape cartridges will no longer be supported by roller 13b and 14b and they will drop upon the separated cartridge from the second stack. Further rotation causes rollers 13a and 14a to support the entire first stack including the separated cartridge from the second stack which now is an member in the first stack.

A bi-directional rotational servo generates the angular motion of the bodies 11 and 12. The bi-directional rotational servo provides the functionality for the separator apparatus to separate magnetic tape cartridges from either the first or second stack. In the preferred embodiment, the circumference of each of wheels 15 and 16 are in the form of gear teeth. The radii of wheels 15 and 16 are chosen such that gear teeth on wheel 15 cooperate with the gear teeth on wheel 16. In this embodiment, the action of the bi-directional rotational servo on one of the wheels produces the desired simultaneous rotation of the other wheels in the opposite direction at the same angular velocity.

The embodiment of the invention described above—i.e., a bi-directional separator apparatus, a first stack of magnetic tape cartridges biased against the top of the separator apparatus and a second stack of magnetic tape cartridges biased against the bottom of the separator apparatus, can structurally and functionally be viewed as an apparatus that can randomly access and separate for loading into an associated tape drive at any time any magnetic tape cartridge in one large stack of magnetic tape cartridges. By reversing the direction of the separator apparatus, the separator simply transfers magnetic tape cartridges from the first stack to the second stack or from the second stack to the first stack.

Figure 8:
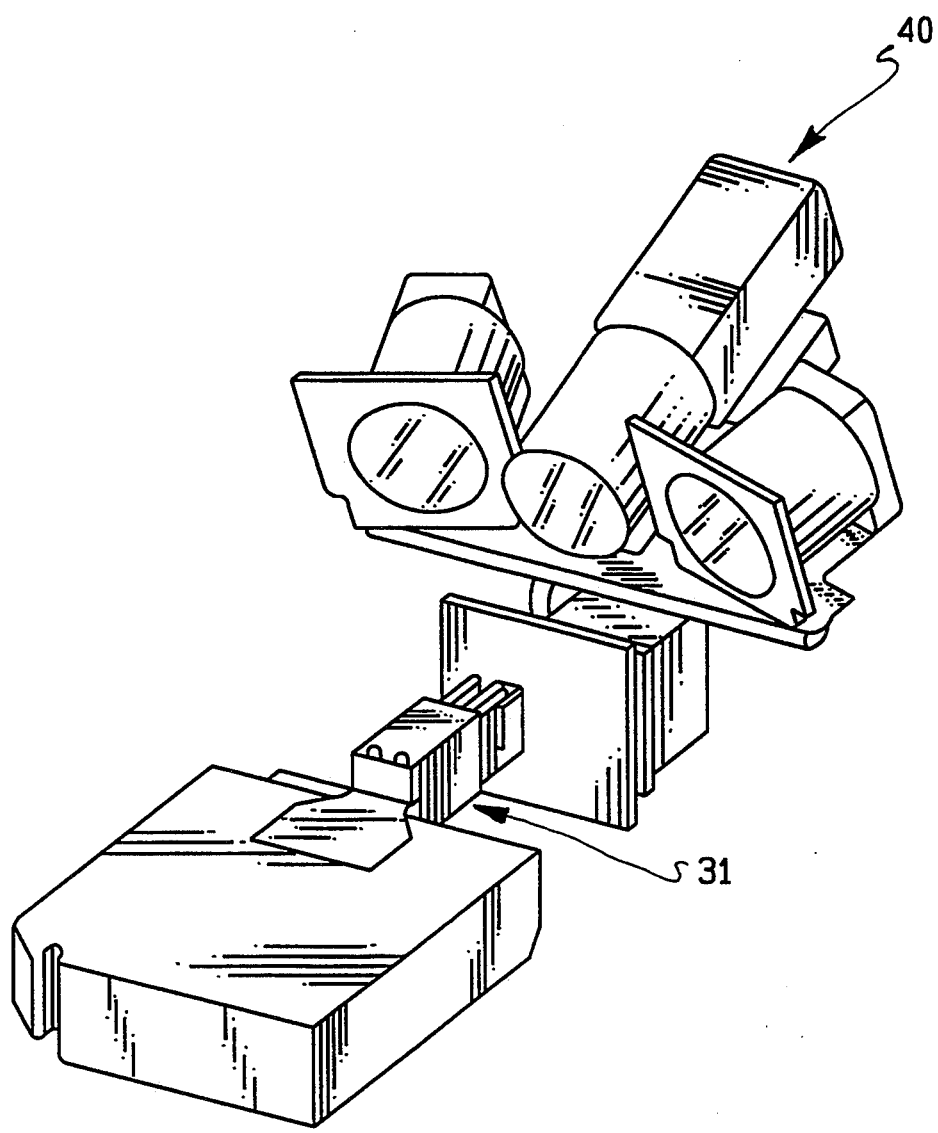
FIG. 8 is an illustration of the gripping means of FIG. 4 with a camera assembly.

Given the ability described above to individually separate any magnetic tape cartridge at any time for loading into an associated tape drive, the order in which the plurality of magnetic tape cartridges are loaded into the automatic magnetic tape cartridge separator apparatus is no longer important so long as the apparatus can identify which magnetic tape cartridge is separated any particular time. In an alternative embodiment of the invention shown in FIG. 8, optical means 40 are employed to identify the separated magnetic tape cartridge. Optical means includes, but is not limited to, known bar coders or video camera means.

Although the invention to this point has been described in the context of stacks of magnetic tape cartridges aligned along a vertical axis whereby the first stack is biased against the separator by means of gravity, the present invention contemplates an automatic magnetic tape cartridge separator apparatus operating upon stacks aligned along any axis. In embodiments in which the force of gravity is not sufficient to bias the stack of magnetic tape cartridges against the separator apparatus to permit normal operation, spring loaded trays or similar devices are used to augment or substitute for the effects of gravity to bias the stack against the separator apparatus.

Although the invention has been described and illustrated in detail, it is to be clearly understood that the same is by way of illustration and example only and is not to be taken by way of limitation. The spirit and scope of this invention are limited only by the terms of the appended claims.

What is claimed is:

1. An apparatus for automatically loading magnetic tape cartridges onto an associated tape drive comprising:
   means for loading one or more magnetic tape cartridges into the associated tape drive;
   means displaced from the loading means for receiving a plurality of magnetic tape cartridges forming a stack oriented along an axis, adjacent magnetic tape cartridges in the stack abutting at an interface;
   a first and second rotatable body, each having two or more separating rods circumferentially and evenly disposed about and projecting along the axis of rotation of their respective rotatable body, the axis of rotation of the first rotatable body and the axis of rotation of the second rotatable body aligned in a plane perpendicular to the axis of the stack;
   means for biasing the stack against the first and second rotatable bodies; and
   means for rotating the first and second bodies simultaneously in opposite directions wherein one separating rod of the first rotatable body and one separating rod of the second rotatable body engage from opposite directions the interface between the next magnetic tape cartridge in the stack and the remainder of the stack.

2. The apparatus of claim 1, wherein the biasing means includes the force of gravity.

3. The apparatus of claim 1, wherein the biasing means includes a spring loaded device.

4. The apparatus of claim 1, wherein each separating rod comprises:
   a shaft; and
   a freely rotatable annular sleeve circumjacent to the shaft, wherein the annular sleeve is free to rotate about the shaft.

5. The apparatus of claim 1, wherein the rotating means comprises:
   gearing means such that the rotation of one of the rotatable bodies generates the opposite rotation of the other rotatable body.

6. The apparatus of claim 1, further comprising optical means for identifying a magnetic tape cartridges.

7. The apparatus of claim 1, wherein another separating rod of the first rotatable body and another separating rod of the second rotatable body support the next magnetic tape cartridge in the stack while the engaging separating rod of the first rotatable body and the engaging separating rod of the second rotatable body engage from opposite directions the interface between the next magnetic tape cartridge in the stack and the remainder of the stack.

8. The apparatus of claim 7, wherein the loading means are operable when the next magnetic tape cartridge in the stack is supported by the supporting separating rods of the first and second rotatable bodies.

9. An apparatus for automatically loading magnetic tape cartridges onto an associated tape drive comprising:

- means for loading one or more magnetic tape cartridges into the associated tape drive;
- a means displaced from the loading means for receiving a plurality of magnetic tape cartridges forming a first stack oriented along an axis, adjacent magnetic tape cartridges in the stack abutting at an interface;
- a means for holding a plurality of magnetic tape cartridges in a second stack, the second stack being oriented along the axis of the first stack;
- a first and second rotatable body, each having two or more separating rods circumferentially and evenly disposed about and projecting along the axis of rotation of their respective rotatable body, the axis of rotation of the first rotatable body and the axis of rotation of the second rotatable body aligned along a plane perpendicular to the orientation of the first and second stacks and disposed between the first and second stacks;
- means for biasing from a first direction the first stack against the first and second rotatable bodies;
- means for biasing from a second direction opposite from the first direction the second stack against the first and second rotatable bodies;
- means for rotating the first and second bodies simultaneously in opposite directions wherein one separating rod of the first rotatable body and one separating rod of the second rotatable body engage from opposite directions the interface between the next magnetic tape cartridge in the first stack and the remainder of the first stack; and
- means for rotating the first and second bodies simultaneously in opposite directions wherein one separating rod of the first rotatable body and one separating rod of the second rotatable body engage from opposite directions the interface between the next magnetic tape cartridge in the second stack and the remainder of the second stack.

10. The apparatus of claim 9, wherein each separating rod comprises:
- a shaft; and
- a freely rotatable annular sleeve circumjacent to the shaft, wherein the annular sleeve is free to rotate about the shaft.

11. The apparatus of claim 9, wherein the rotating means comprises:
- gearing means such that the rotation of one of the rotatable bodies generates the opposite rotation of the other rotatable body.

12. The apparatus of claim 9, further comprising optical means for identifying a magnetic tape cartridges.

13. The apparatus of claim 9, wherein the biasing means includes the force of gravity.

14. The apparatus of claim 9, wherein the biasing means includes a spring loaded device.

15. The apparatus of claim 9, wherein another separating rod of the first rotatable body and another separating rod of the second rotatable body support the next magnetic tape cartridge in the first stack while the engaging separating rod of the first rotatable body and the engaging separating rod of the second rotatable body engage from opposite directions the interface between the next magnetic tape cartridge in the first stack and the remainder of the first stack.

16. The apparatus of claim 15, wherein the loading means are operable when the next magnetic tape cartridge in the first stack is supported by the supporting separating rods of the first and second rotatable bodies.

17. The apparatus of claim 9, wherein the engaging separating rod of the first rotatable body and the engaging separating rod of the second rotatable body support the next magnetic tape cartridge in the second stack.

18. The apparatus of claim 17, wherein another separating rod of the first rotatable body and another separating rod of the second rotatable body support the first stack while the engaging separating rod of the first rotatable body and the engaging separating rod of the second rotatable body support the next magnetic tape cartridge in the second stack.

19. The apparatus of claim 18, wherein the loading means are operable when the next magnetic tape cartridge in the second stack is supported by the engaging separating rods of the first and second rotatable bodies.

* * * * *